United States Patent
Correia Villa Real et al.

(10) Patent No.: US 11,853,452 B2
(45) Date of Patent: Dec. 26, 2023

(54) KEEPING DATABASES COMPLIANT WITH DATA PROTECTION REGULATIONS BY SENSING THE PRESENCE OF SENSITIVE DATA AND TRANSFERRING THE DATA TO COMPLIANT GEOGRAPHIES

(71) Applicant: International Business Machines Corporation, Armonk, NY (US)

(72) Inventors: Lucas Correia Villa Real, Sao Paulo (BR); Rogerio Cesar Barbosa dos Santos da Silva Silva, Sao Paulo (BR); Claudio Bandeira Dutra, São Paulo (BR); Raphael Guedes Amorim, São Paulo (BR)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 17/519,901

(22) Filed: Nov. 5, 2021

(65) Prior Publication Data

US 2023/0142102 A1    May 11, 2023

(51) Int. Cl.
  *G06F 21/62* (2013.01)
  *G06F 16/25* (2019.01)
  *G06F 21/60* (2013.01)

(52) U.S. Cl.
  CPC ........ *G06F 21/6227* (2013.01); *G06F 16/258* (2019.01); *G06F 21/604* (2013.01)

(58) Field of Classification Search
  USPC .......................................................... 726/1
  See application file for complete search history.

(56) References Cited

U.S. PATENT DOCUMENTS

| | | | |
|---|---|---|---|
| 7,376,636 B1 | 5/2008 | Wang et al. | |
| 8,635,192 B2 | 1/2014 | Klassen et al. | |
| 8,676,593 B2 | 3/2014 | Nagpal et al. | |
| 8,918,867 B1 * | 12/2014 | Salour ................. | G06F 21/6245 |
| | | | 726/22 |
| 9,262,438 B2 | 2/2016 | Agrawal et al. | |
| 9,361,317 B2 | 6/2016 | Lightner et al. | |
| 10,778,693 B2 | 9/2020 | Akireddy et al. | |

(Continued)

FOREIGN PATENT DOCUMENTS

| | | |
|---|---|---|
| CN | 101350012 B | 1/2013 |
| KR | 101397322 B1 | 5/2014 |

OTHER PUBLICATIONS

Anonymous, "Managing data locations in a cloud"; Ip.com IPCOM000227725D; May 13, 2013; 6p.

(Continued)

*Primary Examiner* — Sanchit K Sarker
(74) *Attorney, Agent, or Firm* — CANTOR COLBURN LLP; Erik Johnson

(57) ABSTRACT

Embodiments relate to keeping databases compliant with data protection regulations by sensing the presence of sensitive data and transferring the data to compliant geographies. A request including information is received, the request being intended for processing on a local database. A model is used to process the information of the request. Responsive to the model determining that information relates to sensitive data, the request is transferred to a remote database associated with a geography meeting a requirement for the sensitive data in order to execute the request.

17 Claims, 17 Drawing Sheets

(56) References Cited

U.S. PATENT DOCUMENTS

| | | | |
|---|---|---|---|
| 10,798,133 B2* | 10/2020 | Barday | G06F 16/9038 |
| 10,812,455 B1 | 10/2020 | Reissner et al. | |
| 10,839,099 B2* | 11/2020 | Vogel | G06F 21/6245 |
| 10,846,261 B2 | 11/2020 | Barday et al. | |
| 2002/0174124 A1 | 11/2002 | Haas et al. | |
| 2011/0165888 A1 | 7/2011 | Shuman et al. | |
| 2018/0004972 A1* | 1/2018 | Ruggiero | H04L 63/107 |
| 2018/0007050 A1* | 1/2018 | Ruggiero | H04L 63/20 |
| 2019/0018860 A1 | 1/2019 | Porpora et al. | |
| 2019/0242719 A1 | 8/2019 | Cervelli et al. | |
| 2020/0320202 A1* | 10/2020 | Farkash | G06N 20/00 |
| 2021/0089835 A1* | 3/2021 | Ma | G06N 3/08 |

OTHER PUBLICATIONS

Ashbel, "Database Compliance with Data Privacy Regulations", NetApp Inc., Apr. 21, 2021, 9 pages.
In Country [online]; [retrieved on Jun. 11, 2008]; retrieved from the Internethttps://incountry.com/ 12pages.
Informatica, "Intelligent Data Privacy: Discover, Classify, and Protect Personal and Sensitive Data"; Informatica LLC 2018, 16p.

* cited by examiner

FIG. 3A 300

RECEIVE A REQUEST TO PERFORM AN ACTION ON A LOCAL DATABASE 302

INSERT A HOOK IN REQUEST 304

PERFORM TEXT PROCESSING ON REQUEST AND/OR EMPLOY A TEXT PROCESSING MODEL SUCH AS A NATURAL LANGUAGE PROCESSING (NLP) MODEL TO PERFORM TEXT PROCESSING ON REQUEST 306

USE THE COUNTRY CODE AND/OR THE NAME OF THE COUNTRY (E.G., 'COUNTRY D') TO SEARCH AND FIND THE REGULATION CODE FOR THAT COUNTRY/GEOGRAPHIC LOCATION IN REGULATION CODE DATABASE 308

GENERATE TOKENS OF THE REQUEST AND PROVIDE THE TOKENS TO FEATURE EXTRACTION MODEL AND/OR CALL ON AND/OR INSTRUCT FEATURE EXTRACTION MODEL TO PROCESS THE TOKENIZED INFORMATION IN REQUEST 310

CONCATENATE AND/OR COMBINED THE INDIVIDUAL FEATURE VECTORS OF THE PARAGRAPH MATRIX INTO A DOCUMENT VECTOR OF EACH OF THE INDIVIDUAL FEATURE VECTORS 312

AS PART OF TRAINING A MACHINE LEARNING MODEL, INPUT TO MODEL THE DOCUMENT VECTOR HAVING FEATURE VECTORS, WEIGHTS CORRESPONDING TO EACH OF FEATURE VECTORS, AND THE SENSITIVE/NON-SENSITIVE TAG 314

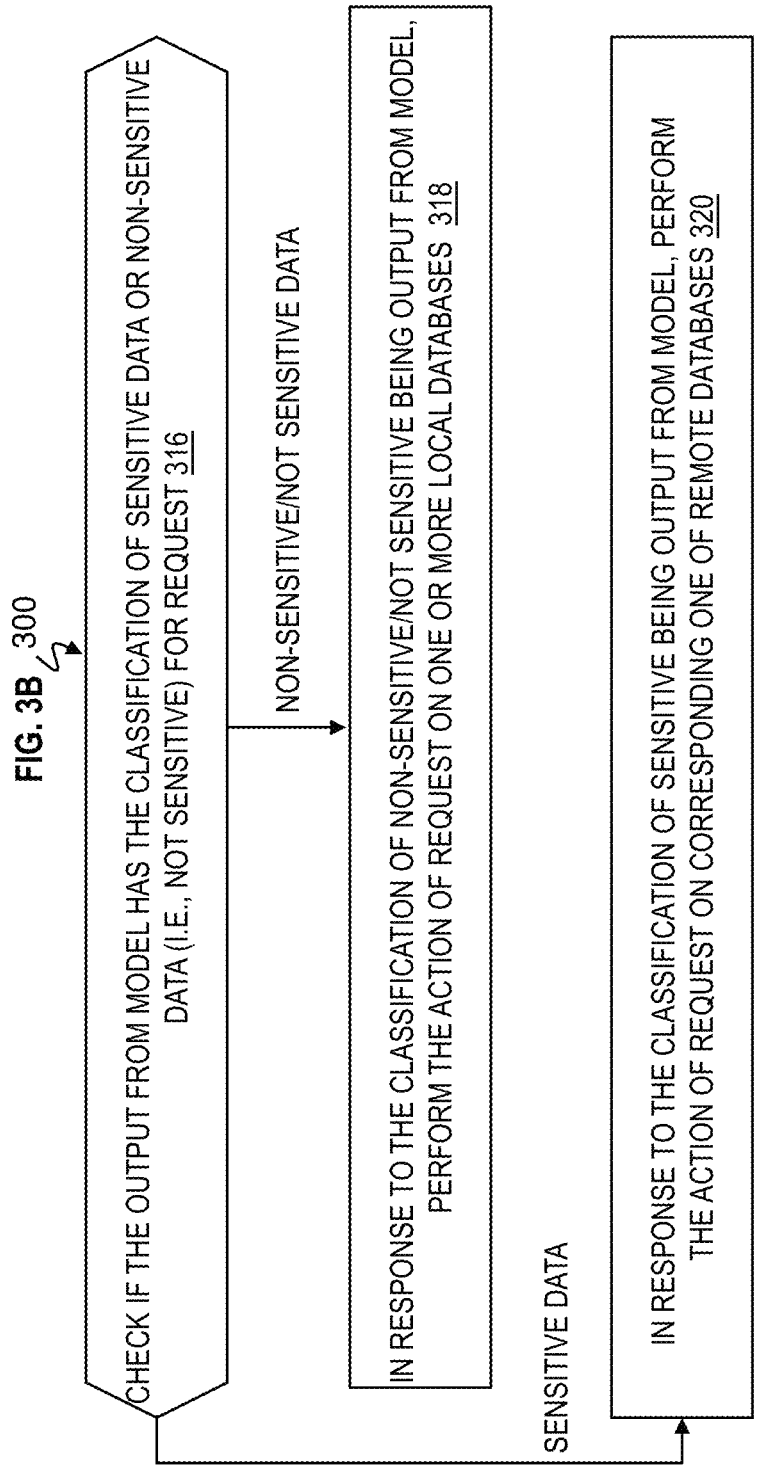

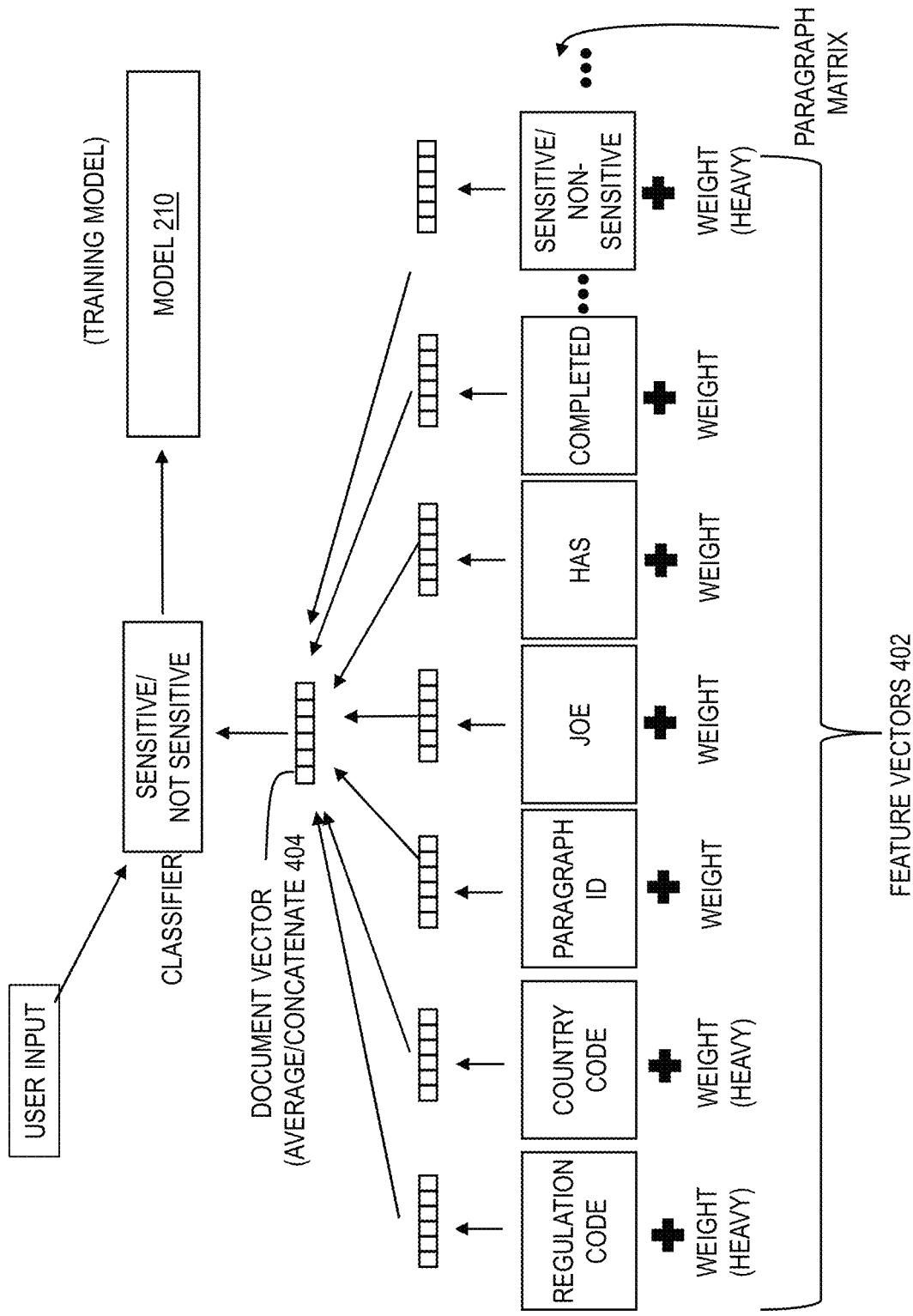

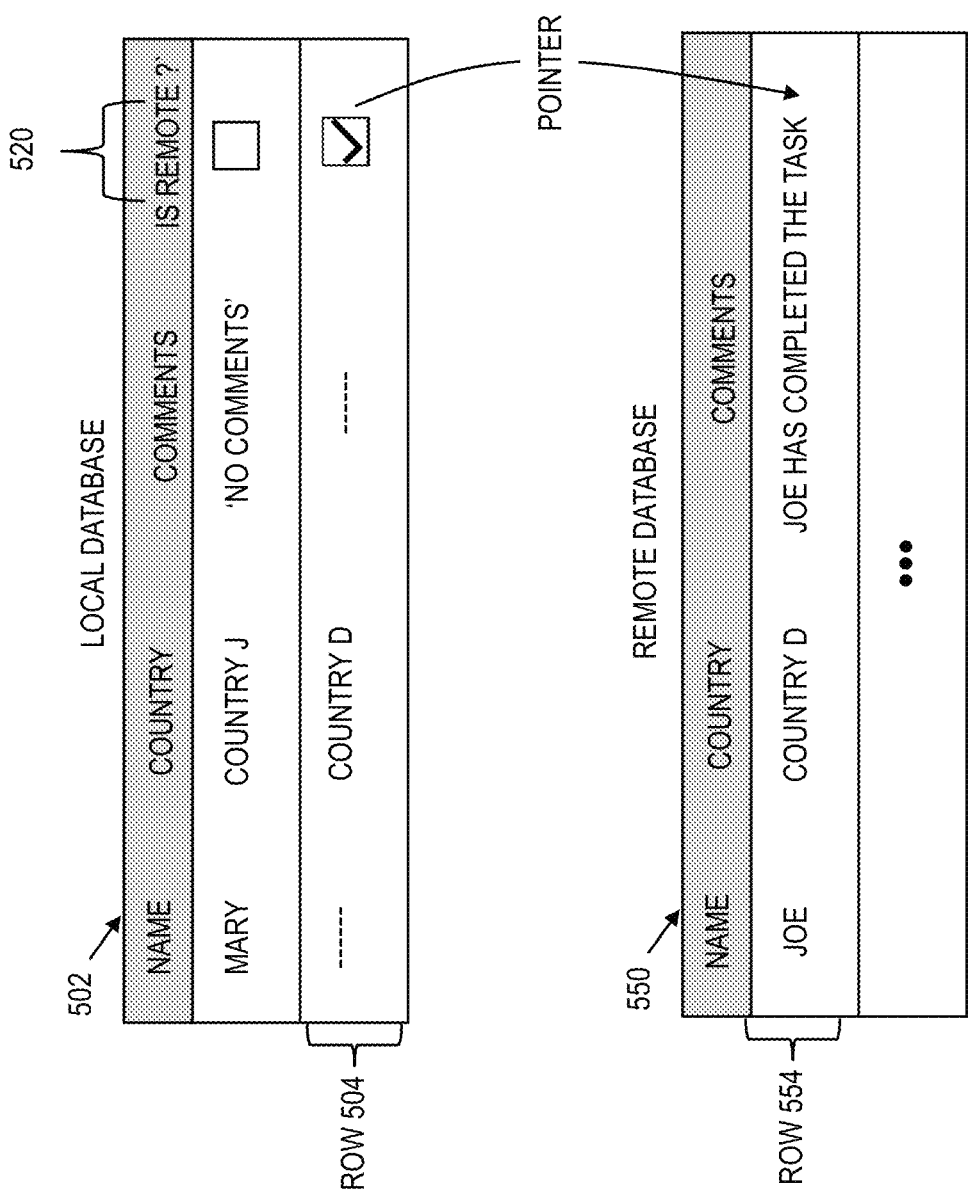

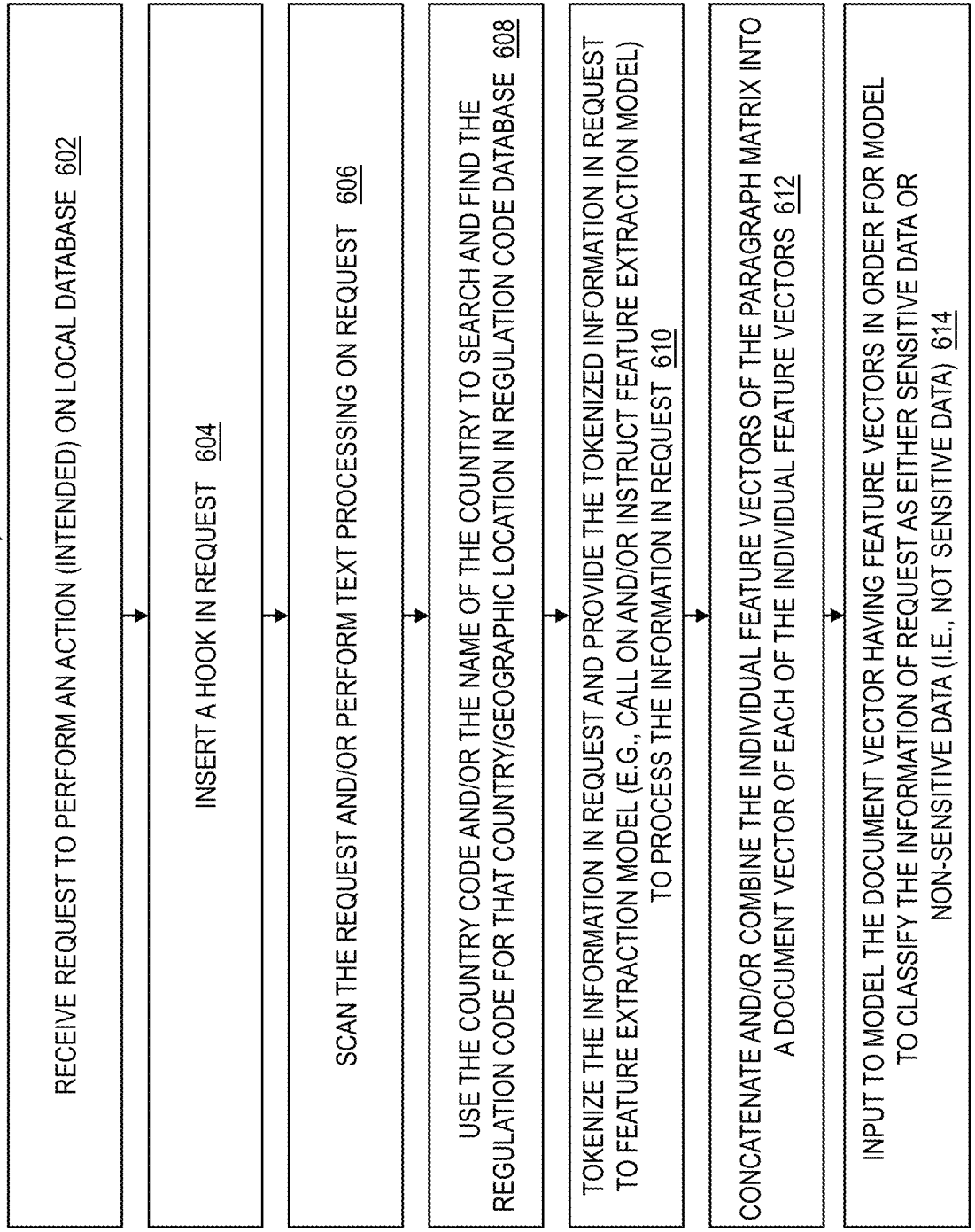

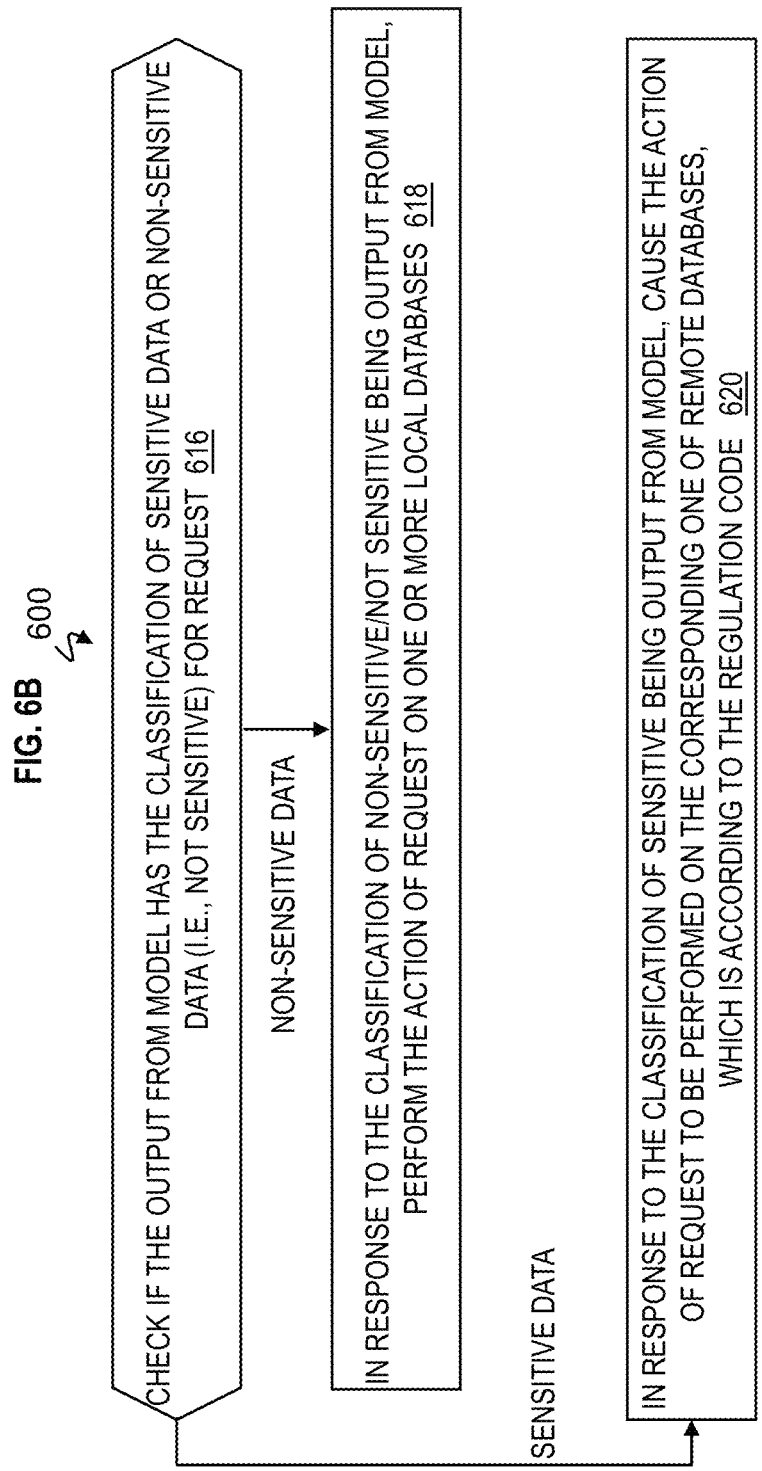

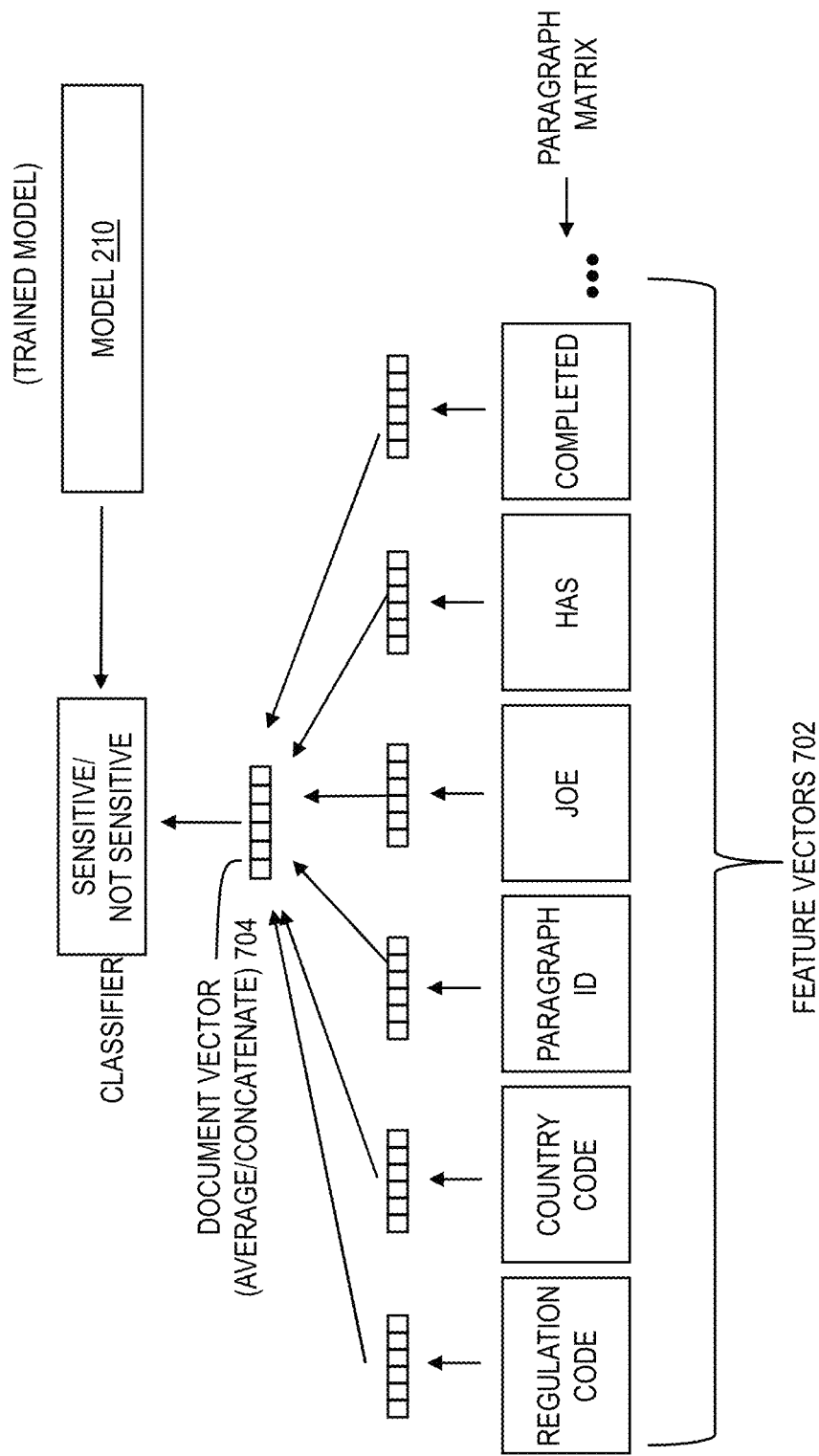

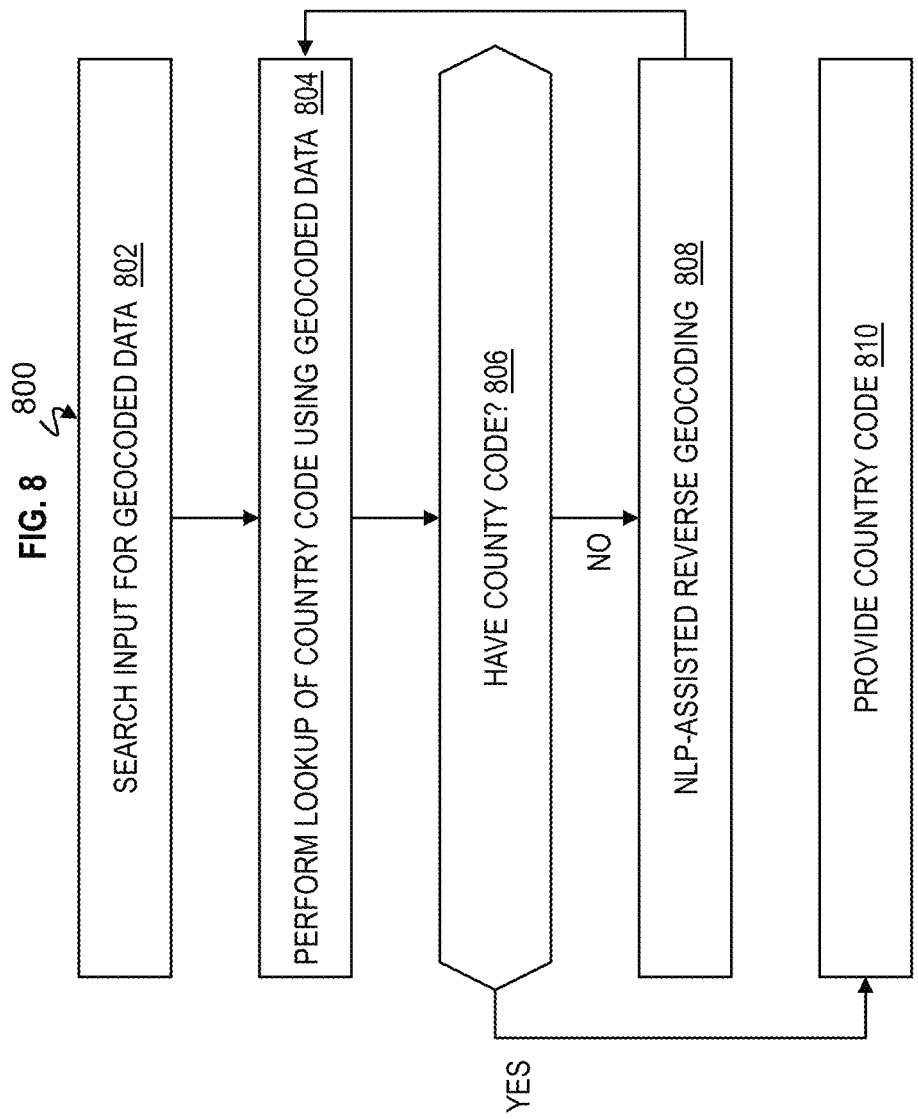

KEEPING DATABASES COMPLIANT WITH DATA PROTECTION REGULATIONS BY SENSING THE PRESENCE OF SENSITIVE DATA AND TRANSFERRING THE DATA TO COMPLIANT GEOGRAPHIES

BACKGROUND

The present invention generally relates to computer systems, and more specifically, to computer-implemented methods, computer systems, and computer program products configured and arranged for keeping databases compliant with data protection regulations by sensing the presence of sensitive data and transferring the data to compliant geographies.

In computing, a database is an organized collection of data stored and accessed electronically from a computer system. Access to this data is usually provided by a database management system (DBMS) including an integrated set of computer software that allows users to interact with one or more databases and provides access to all of the data contained in the database, although restrictions may exist that limit access to particular data. The DBMS provides various functions that allow entry, storage, and retrieval of large quantities of information and provides ways to manage how that information is organized.

For many organizations, meeting data and database regulatory compliance and security requirements is a top priority. Failing to meet regulatory requirements can make result in substantial fines and penalties. Similarly, a security breach can cause further issues regarding the services associated with the database. The challenge in maintaining database compliance and security evolves with new threats and new regulations. At the heart of many of these requirements is sensitive data that is stored in an enterprise database system.

SUMMARY

Embodiments of the present invention are directed to computer-implemented methods for keeping databases compliant with data protection regulations by sensing the presence of sensitive data and transferring the data to compliant geographies. A non-limiting example computer-implemented method includes receiving a request comprising information, the request being intended for processing on a local database, and using a model to process the information of the request. Also, the computer-implemented method includes responsive to the model determining that information relates to sensitive data, transferring the request to a remote database associated with a geography meeting a requirement for the sensitive data in order to execute the request.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIGS. 3A and 3B depict a flowchart of a computer-implemented method for training model to classify sensitive data and non-sensitive data to be utilized for keeping databases compliant with data protection regulations such that the data can be transferred to compliant geographies in accordance with one or more embodiments of the present invention;

FIG. 4 depicts a block diagram of an example creating feature vectors for a paragraph matrix and generating a document vector in accordance with one or more embodiments of the present invention;

FIG. 5 depicts a block diagram of example table representations on disks in accordance with one or more embodiments of the present invention;

FIGS. 6A and 6B depict a flowchart of a computer-implemented method for using a model to classify sensitive data and non-sensitive data to be utilized for keeping databases compliant with data protection regulations such that the data can be transferred to compliant geographies in accordance with one or more of the present invention;

FIG. 7 depicts a block diagram of example feature vectors for a paragraph matrix and a document vector in accordance with one or more embodiments of the present invention;

FIG. 8 is a flowchart of an example computer-implemented geocoding process in accordance with one or more embodiments of the present invention;

DETAILED DESCRIPTION

One or more embodiments of the present invention provide computer-implemented methods, computer systems, and computer program products arranged and configured for keeping databases compliant with data protection regulations by sensing the presence of sensitive data and transferring the data to compliant geographies. One or more embodiments of the invention are configured to extract geographical information from pieces of sensitive data entered onto a database and then decide where to store that data according to privacy law regulations. If the resolved coordinates associated with the sensitive data map to a geography other than the one covered by the local regulation, the data is forwarded for storage on a foreign server that contemplates and/or complies with the regulation in charge of that geography. By using a machine learning model to process query rows, even subtle characteristics can be captured and used to determine the appropriate server on which to store this data according to one or more embodiments of the invention.

Privacy law regulations are becoming popular around the world. For that reason, it has become mandatory that companies abide by the new regulations to avoid penalties and give clarity to customers that their data is being properly handled. One concern is that some regulations require data processors to store data under certain geographies, for example, to store private information from citizens of the countries in the geography where that regulation applies.

Software applications are configured to maintain database compliance with data protection regulations by sensing the presence of sensitive data intended for one or more (database) servers and transferring the data to one or more servers in compliant geographies. Moreover, one or more embodiments of the invention resolve the problem with database storage on computer systems which is a technical solution to a technical problem, which could not be performed in the human mind with or without the assistance of pen/paper. Further, one or more embodiments could help avoid and/or prevent a malicious computer attack or intrusion, a computer security threat, a serious malfunction of software/hardware, a violation of data privacy laws and protections, etc., thereby improving the functioning of a computer system itself as well as multiple computer systems interconnected in a cloud environment, thereby preventing further exposure to the potential problem.

Figure 1:
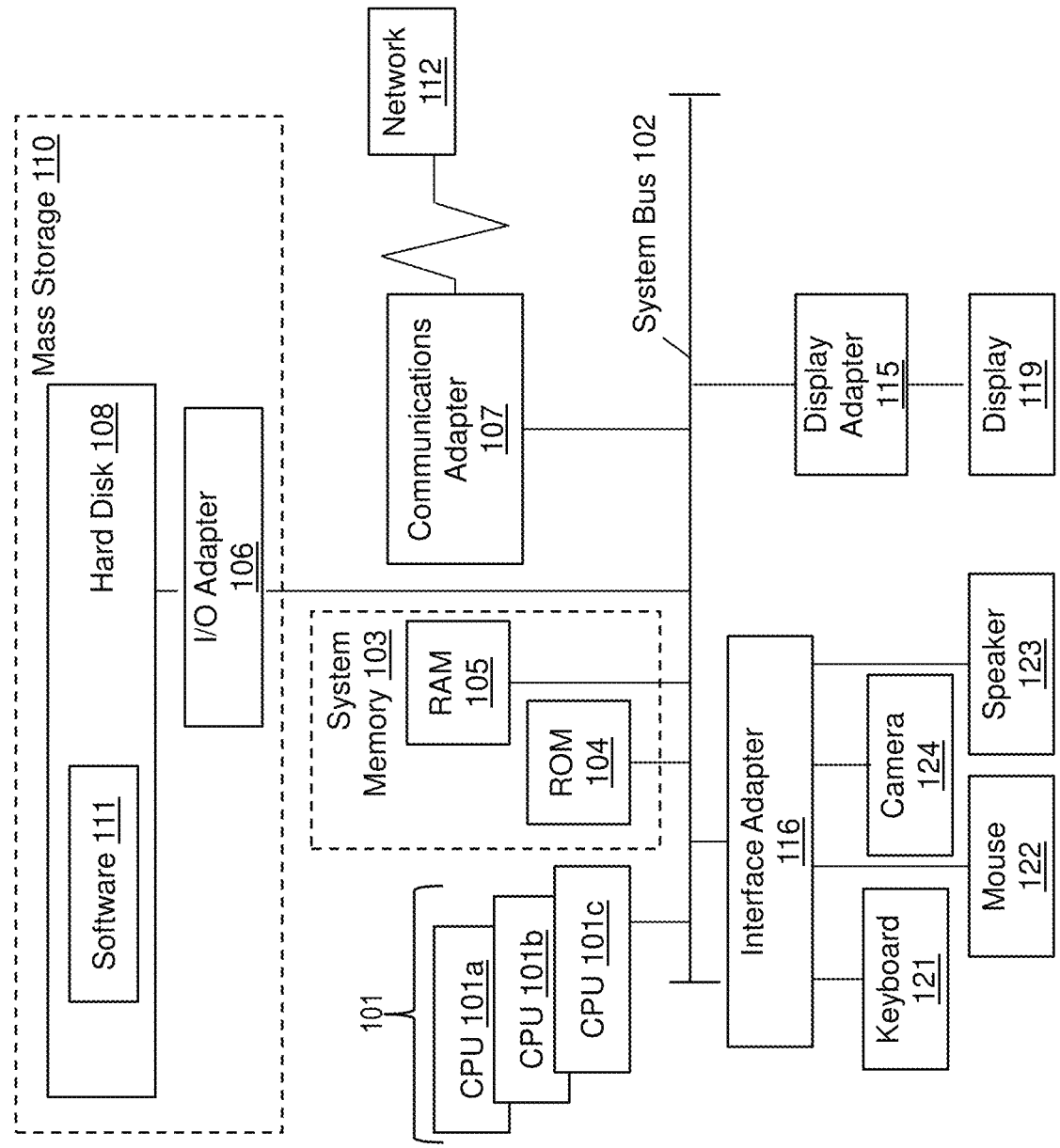
FIG. 1 depicts a block diagram of an example computer system for use in conjunction with one or more embodiments of the present invention.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, a camera 124, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121, camera 124, and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
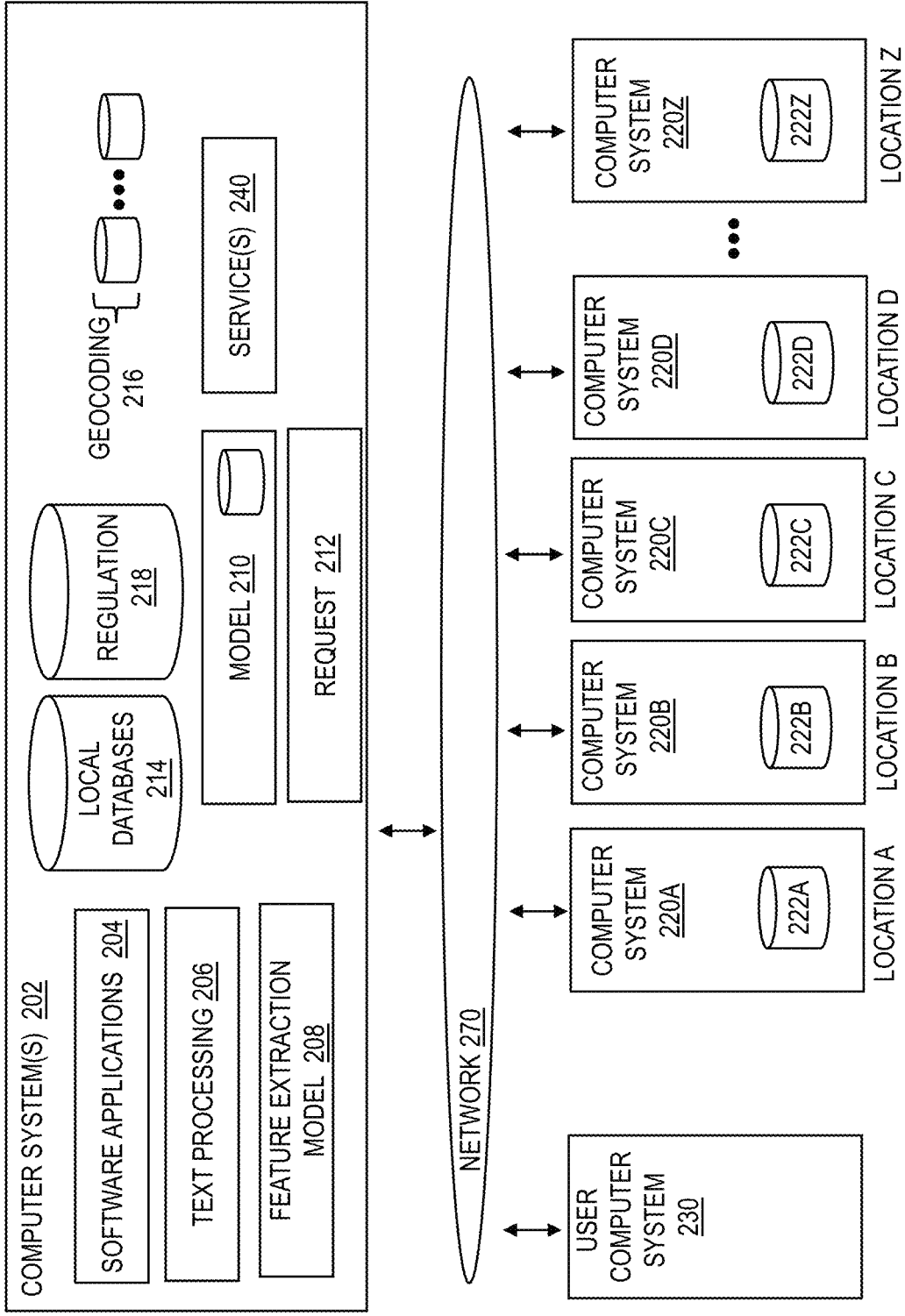
FIG. 2 is a block diagram of an example computing environment which is configured to keep databases compliant with data protection regulations by sensing the presence of sensitive data and transferring the data to compliant geographies in accordance with one or more embodiments of the present invention.

FIG. 2 is a block diagram of an example computing environment 200 which is configured to keep databases compliant with data protection regulations by sensing the presence of sensitive data and transferring the data to compliant geographies according to one or more embodiments of the inventions. Computing environment 200 can include computer system(s) 202 coupled to computer systems 220A, 220B, 220C through 220Z and coupled to one or more user computer systems 230 via a network 270. Computer systems 220A, 220B, 220C through 220Z can generally be referred to as remote computer systems 220, which may be foreign computer systems such as servers. Computer systems 202, 220, and 230 can include any of the hardware and software components and functionality discussed in computer system 100 of FIG. 1. Computing environment 200 may be representative of one or more portions of a cloud computing environment. Computer systems 220 are the hardware on which applications run and may include various servers, mainframes, etc. In one or more embodiments, computer system 202 may be representative of a single server or one or more servers. Computer system 202 includes one or more software applications 204 configured to keep databases compliant with data protection regulations by sensing the presence of sensitive data and transferring the data to compliant geographies, thereby maintaining database compliance in accordance with one or more embodiments. Moreover, software applications 204 are configured to perform/take/cause actions to prevent and resolve database compliance issues on computer systems. Functions of computing environment 200 can use and/or be implemented in workloads of workload layer 90 and can use any of the components of hardware and software layer 60 depicted in FIG. 15.

FIGS. 3A and 3B depict a flowchart of a computer-implemented method 300 for training model 210 to classify sensitive data and non-sensitive data to be utilized for keeping databases compliant with data protection regulations such that the data can be transferred to compliant geographies in accordance with one or more embodiments.

At block 302 of the computer-implemented method 300, software application 204 of computer system 202 is configured to receive a request 212 from the user of user computer system 230 to perform an action on and/or intended for a local database 214. Local database 214 is the main database associated and geographically located with one or more services 240 performed by one or more computer systems 202. The desired action to be performed on local database 214 could be to insert/store data, update data, delete data, select/read data, etc., on and/or associated with local database 214 coupled to computer system 202. Local database 214 can be representative of numerous local databases in a local geography. The local geography may be, for example, in the United States, in North America, etc. Computer systems 220A, 220B, 220C through 220Z can be representative of a foreign geography and/or foreign region such as, for example, Country A, B, C through Z.

For explanation purposes, request 212 may include the following database command/information: "Insert into users (name, country, comments) Values('Joe'; 'Country D', 'Joe has completed his task')". Request 212 can have, be included with, and/or be associated with header/other information as understood by one of ordinary skill in the art.

At block 304, software application 204 delegates processing of request 212 to a function hooked into the database system. In this context, the hook is a place where code is inserted to customize the original program logic; database extensions such as Foreign Data Wrappers and INSERT/UPDATE/DELETE rule systems can be used to implement a hook on contemporary relational database systems. The inserted code is used to intercept request 212 and route the request 212 to the proper geographic location/region as determined herein.

At block 306, software application 204 is configured to scan request 212 which may include performing text processing on request 212 and/or employing a text processing model 206 such as a natural language processing (NLP) model to perform text processing on request 212. As understood by one of ordinary skill in the art, NLP combines computational linguistics such as rule-based modeling of human language with statistical, machine learning, and deep learning models. Together, these technologies enable computers to process human language in the form of text or voice data and to understand its full meaning, complete with the writer's intent and sentiment. Using NLP, software application 204 is configured to capture semantic meaning from the unstructured text and/or structured text of request 212 and/or the header information associated with request 212. Particularly, software application 204 can scan request 212 for a country code. For example, text processing can determine in request 212 (and/or header information associated with request 212) that the term 'Country D' is the name of a country. Accordingly, software application 204 is configured to send the name 'Country D' to a geotagging service which includes reverse geocoding in order to convert the name of the country (e.g., 'Country D') to its latitude and longitude coordinates. In one or more embodiments, software application 204 may include the functionality of a geotagging service and/or reverse geocoding service. In one or more embodiments, software application 204 may access and/or communicate with an application programming interface (API) to access the geotagging service and/or reverse geocoding service. Software application 204 is configured to perform a lookup in geocoding databases 216 using user information in request 212 and using header/other information associated with request 212 (and user) to find a country code for the user. Geocoding databases 216 include the names of various countries and their associated geographical coordinates (e.g., latitude and longitude coordinates) and also includes their respective country codes. Geocoding databases 216 include zip code to country code tables/databases, Internet protocol (IP) address to country code tables/databases, and other types of tables/databases that translate user information to a country code. Accordingly, software application 204 can search geocoding databases 216 with the country name (e.g., 'Country D'), IP address of user computer system, and/or zip code of user computer system 230 to find the country code of the user. The header information of request 212 may include the IP address, port, zip code, etc. In one or more embodiments, software application 204 may find a street address in request 212 and/or header information, and software application 204 can search with the street address in geocoding databases 216 to find the country code.

At block 308, software application 204 is configured use the country code and/or the name of the country (e.g., 'Country D') to search and find the regulation code for that country/geographic location in regulation code database 218. During the training phase, software application 204 is configured to receive confirmation of the regulation code through administrator input. The country code may be the name of a country, the name of a region, the name of a continent, coalition of countries, etc.; the regulation database 218 maps the country code to its regulation code. The regulations associated with the regulation codes can include privacy law regulations that instruct how user data is to be handled and stored including the geographies in which the user data can be stored.

At block 310, software application 204 is configured to tokenize the information in request 212 and provide the tokenized information for request 212 to feature extraction model 208 (and/or call on and/or instruct feature extraction model 208) to process the tokenized information in request 212. The tokenized information can include tokens of the "Values" in request 212. Tokenization is a way of separating a piece of text into smaller units called tokens, where tokens can be either words, characters, or subwords. A standard technique for tokenization can be utilized as understood by one of ordinary skill in the art. An example tokenization technique is the white space tokenization, in which spaces are used as delimiters of words. Feature extraction model 208 is configured to extract word embeddings (i.e., create vectors) of the tokens. Feature extraction model 208 can be a standard feature extraction model used to convert words/documents to vectors. An example feature extraction model 208 is doc2vec as understood by one of ordinary skill in the art. The doc2vec model is an unsupervised machine learning algorithm. The doc2vec model is an architecture based on the contiguous bag-of-words and skip-gram models as understood by one of ordinary skill in the art. The objective is to create a numerical representation of the document.

The feature extraction model 208 (e.g., doc2vec) receives tokens of the information in the request 212 and creates feature vectors 402, as depicted in FIG. 4. A feature vector is an n-dimensional vector of numerical features that represent some object. The feature extraction model 208 generates a paragraph identification (ID) feature vector that identifies the document and/or request 212. Additionally, software application 204 is configured to provide the regulation code and country code to feature extraction model 208 as additional tokens, such that feature extraction model 208 generates additional feature vectors for the regulation code and country code, respectively. The feature vectors 402 are the word vectors that hold the numeric representation and represent the concept of a paragraph. Particularly, the paragraph ID vector is the identification vector that holds the numeric representation identifying the document and represents the concept of a document/request. During the training phase, using a keyboard, mouse, touch screen, etc., the user can add weights to each of the feature vectors 402 in FIG. 4. Each weight can indicate the importance of a feature vector in determining the contribution of the feature vector to the decision of whether the data is sensitive or not sensitive. As such, having a heavy weight has more influence than other weights. The various feature vectors 402 and their weights form a paragraph matrix. In creating the paragraph matrix, software application 204 may check that there is a country code, and if so, the feature vector 402 for the country code is assigned a heavy weight. Software application 204 may check if there is a regulation code, and if so, the feature vector 402 for the regulation code is assigned a heavy weight.

Software application 204 is configured to receive input from the administrator (operator) of a classification for information in request 212 according to the country code, and software application 204 is configured to attach the sensitive/non-sensitive flag (i.e., sensitiveness classification) to the paragraph matrix with a heavy weight. Using a keyboard, mouse, touch screen, etc., the administrator can input sensitive or not sensitive to classify the paragraph matrix, thereby classifying the information of request 212 as sensitive or not sensitive data. Alternatively, and/or additionally, the sensitiveness classification may be attached to the document vector prior to input to model 210. In one or more embodiments, a special user interface is provided to the user so that the user can classify the request.

Referring to FIG. 3A, at block 312, software application 204 (e.g., using feature extraction model 208) is configured to concatenate and/or combine the individual feature vectors 402 of the paragraph matrix into a document vector 404 of each of the individual feature vectors 402.

At block 314, as part of training a machine learning model 210, software application 204 is configured to input to model 210 the document vector 404 having feature vectors 402, weights corresponding to each of feature vectors 402, and the sensitive/non-sensitive tag. Document vector 404 is added to a model training database of model 210. In one or more embodiments of the invention, the administrator can label the document vector 404 as sensitive or non-sensitive for input to model 210, and in this case, alternative methods (other than doc2vec) could be used to characterize the words that belong to the document. In one or more embodiments of the invention, model 210 can be a logistic regression model that uses the input to classify/label the output as sensitive data or non-sensitive data. The model 210 includes engines/classifiers that can be configured and arranged to execute machine learning algorithms as understood by one of ordinary skill in the art. In general, machine learning algorithms, in effect, extract features from received data (e.g., inputs to the model 210) in order to "classify" the received data. Examples of suitable classifiers include but are not limited to neural networks, support vector machines (SVMs), logistic regression, decision trees, hidden Markov models (HMIs), etc. The end result of the classifier's operations, i.e., the "classification," is to predict a class for the data. The machine learning algorithms apply machine learning techniques to the received data in order to, over time, create/train/update a unique "model." The learning or training performed by the engines/classifiers can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier. Unsupervised learning can utilize additional learning/training methods including, for example, clustering, anomaly detection, neural networks, deep learning, and the like.

Referring to FIG. 3B, at block 316, software application 204 is configured to execute model 210 (e.g., logistic regression model) and check if the output from model 210 has the classification of sensitive data or non-sensitive data (i.e., not sensitive) for request 212. At block 318, in response to the classification of non-sensitive/not sensitive being output from model 210, software application 204 is configured to perform the action of request 212 on one or more local databases 214. The action of request 212 may be to insert data into local database 214, for example, to "Insert into users(name, country, comments) Values('Joe'; 'Country D', 'Joe has completed his task')" in a table of local database 214. Local databases 214 are databases that are local to and/or in the same geographical location or region as one or more services 240 performed for user computer system 230 that has sent request 212. The services 240 are associated with local databases 214. For example, the services 240 may require use of data in local databases 214 to execute and perform as intended. The user may be interacting with a service 240 originating from, executed at least in part in, and/or deemed to be in the same geography as local database 214. Example services may include, but are not limited, financial transactions, gaming services, social media services, online services, etc., which are performed (at least in part) on one or more computer systems 202 and facilitate electronic interactions with the user of user computer system 230. The request 212 is intended to be performed on local database 214, and software application 204 is configured to determine if the request 212 is permitted to be performed on local databases 214 or remote databases 222A, 222B, 22C, through 222Z that at different geographical locations/regions from local databases 214. In some cases, a geographical location or region could be greater than the country boundaries; as such a local database could be in the same geographical location/region as the user on user computer system 230.

For illustration purposes, computer systems 220A, 220B, 220C, through 220Z are each respectively in geographical location/region A, B, C, through Z, which are different from the geographical location/region of local databases 214 and services 240. Each geographical location/region can have a regulation code in regulation database 218 that identifies the rules about saving types of user data in a foreign geography that is different from the citizenship of the user.

Referring to FIG. 3B, at block 320, in response to the classification of sensitive being output from model 210, software application 204 is configured to perform the action of request 212 on corresponding one of remote databases 222A, 222B, 222C through 222Z. For example, if the user of user computer system 230 is in 'Country D' which has a regulation code, software application 204 is configured to transfer the information of request 212 and/or cause the information of request 212 to be transferred over network 270 to remote database 222D on computer system 220 in the geographical location/region of D (i.e., 'Country D'). To facilitate future data retrieval, software application 204 may store in local database 214 a flag or bit indicating that a row is remote. FIG. 5 depicts a block diagram of example table representations on disks according to one or more embodiments. View 502 illustrates a portion of an example table representation in local database 214. In view 502, row 504 shows that the remote flag/bit 520 is selected, which designates that data of row 504 is stored remotely. Row 504 may store the remote server address to one of the computer systems 220, the remote row ID, etc., such that the remote database 222 can be accessed when needed. View 550 illustrates a portion of an example table representation in a remote database 222 such as, for example, remote database 222D of computer system 220D for geographical location/region D (e.g., 'Country D') that meets the regulation code for the user. In view 550, row 554 shows the information for request 212 that has been transferred by software application 204. This process discussed in FIGS. 3A and 3B is utilized to train model 210 thereby resulting in a trained model.

FIGS. 6A and 6B depict a flowchart of a computer-implemented method 600 for using model 210 to classify sensitive data and non-sensitive data to be utilized for keeping databases compliant with data protection regulations such that the data can be transferred to compliant geographies in accordance with one or more embodiments. Computer-implemented method 600 is utilized with trained model 210. FIGS. 6A and 6B include details from FIGS. 3A and 3B except for operations needed for training. The details discussed for processes in computer-implemented method 300 of FIGS. 3A and 3B may apply where appropriate to the processes in computer-implemented method 600, and some details may not be repeated.

At block 602 of the computer-implemented method 600, software application 204 of computer system 202 is configured to receive request 212 to perform an action (intended) on local database 214. As noted above, the desired action could be to insert/store data, update data, delete data, select/read data, etc., on local database 214 of computer system 202. Further details of each type of request 212 are depicted in FIGS. 9-12 discussed below. Using the example scenario from above, request 212 may include the following database command/information: "Insert into users(name, country, comments) Values('Joe'; 'Country D', 'Joe has completed his task')". Request 212 may be included with and/or be associated with header information as understood by one of ordinary skill in the art.

At block 604, software application 204 executes a function hooked into the database system to process request 212. At block 606, software application 204 is configured to scan request 212 and/or perform text processing on request 212 (and/or employ a text processing model 206 such as the NLP model to perform text processing on request 212). As noted above, software application 204 is configured to capture semantic meaning from the unstructured text/structured text of request 212 and/or the header information associated with request 212 in order to obtain a country code and/or use the information associated with request 212 to obtain the country code. As noted herein, text processing can determine in request 212 (and/or header information associated with request 212) that the term 'Country D' is the name of a country. Accordingly, software application 204 is configured to send the name 'Country D' to a geotagging service which includes reverse geocoding in order to convert the name of the country (e.g., 'Country D') to its latitude and longitude coordinates. As noted herein, software application 204 may include the functionality of a geotagging service and/or reverse geocoding service. Additionally, and/or alternatively, software application 204 may employ/access the geotagging service and/or reverse geocoding service. Software application 204 is configured to perform and/or cause a lookup in geocoding databases 216 using user information in request 212 and using header information associated with request 212 in order to find a country code for the user.

At block 608, software application 204 is configured use the country code and/or the name of the country (e.g., 'Country D') to search and find the regulation code for that country/geographic location in regulation code database 218. At block 610, software application 204 is configured to tokenize the information in request 212 and provide the tokenized information in request 212 to feature extraction model 208 (e.g., call on and/or instruct feature extraction model 208) to process the information of request 212. As noted herein, the tokenized information can include the "Values" in request 212. Feature extraction model 208 is configured to extract word embeddings (i.e., create vectors) of the tokens. The feature extraction model 208 (e.g., doc2vec) receives tokens of the information in the request 212 and creates feature vectors 402, as depicted in FIG. 7. As an example, feature extraction model 208 may be doc2vec or some other feature extraction model as understood by one of ordinary skill in the art. FIG. 7 depicts a block diagram of feature vectors 702 in accordance with one or more embodiments. Feature vectors 702 are analogous to feature vectors 402 except that the weights are removed. Since model 210 has been trained, the user does not add weights to the feature vectors 702 as previously done for feature vectors 402 during the training phase in FIG. 4. The individual feature vectors 702 may be concatenated and/or combined into a document vector 704 of each of the individual feature vectors 702, just as previously discussed for document vector 404 in FIG. 4. The feature extraction model 208 generates a paragraph identification (ID) feature vector that identifies the document and/or request 212. Additionally, software application 204 is configured to provide tokens of the regulation code and country code to feature extraction model 208, such that feature extraction model 208 generates additional feature vectors for the regulation code and country code, respectively. The various feature vectors 402 combined form what is called a paragraph matrix. The paragraph matrix denotes the set of feature vectors. In creating the paragraph matrix, software application 204 may check that there is a country code, and if so, the feature vector 402 for the country code is added to the paragraph matrix. Software application 204 may check if there is a regulation code, and if so, the feature vector 402 for the regulation code is added to the paragraph matrix.

Referring to FIG. 6A, at block 612, software application 204 (e.g., using feature extraction model 208) is configured to concatenate and/or combine the individual feature vectors 702 of the paragraph matrix into a document vector 704 of each of the individual feature vectors 702. At block 614, software application 204 is configured to input to model 210 the document vector 704 having feature vectors 702 in order for model 210 to classify the information of request 212 as either sensitive data or non-sensitive data (i.e., not sensitive data). Since the model 210 is trained, software application 204 does not need the user to input the sensitive/non-sensitive tag and the weights.

Referring to FIG. 6B, at block 616, software application 204 is configured to check if the output from model 210 has the classification of sensitive data or non-sensitive data (i.e., not sensitive) for request 212. At block 618, in response to the classification of non-sensitive/not sensitive being output from model 210, software application 204 is configured to perform the action of request 212 on one or more local databases 214. Continuing the example scenario, the action of request 212 may be to insert data into local database 214, for example, to "Insert into users(name, country, comments) Values('Joe'; 'Country D', 'Joe has completed his task')" in a table of local database 214.

At block 620, in response to the classification of sensitive being output from model 210, software application 204 is configured to cause the action of request 212 to be performed on the corresponding one of remote databases 222A, 222B, 222C through 222Z, which is according to the regulation code. For example, if the user of user computer system 230 is in and/or associated with 'Country D' which has a regulation code, software application 204 is configured to transfer the information of request 212 and/or cause the information of request 212 to be transferred over network 270 to remote database 222D on computer system 220 in the geographical location/region of D (i.e., 'Country D'). This meets the requirement of the regulation code for the user. To facilitate future data retrieval, software application 204 may store in local database 214 a remote flag/bit 520 indicating that a row is remote as depicted in FIG. 5.

In one or more embodiments, model 210 may classify request 212 (in particular the document vector 704) as sensitive but there may not be a destination country or geographical location/region. For example, if no explicit country code is identified, software application 204 has (i) a classification flag that tells software application 204 that the data is sensitive and (ii) the feature vectors 702 of each element featured in the user's request 212. In that case, software application 204 may perform a look up in the trained database of model 210 for the closest match of feature vector 702 to a saved feature vector, identify the destination country where that trained data has been stored, and store the user's request data in a computer system 220 in that same country. Alternatively, and/or additionally, software application 204 may notify the database administrator when data tagged as sensitive does not have an associated destination country, in which case such data could be manually migrated to a remote location.

FIG. 8 is a flowchart of an example computer-implemented geocoding process 800 in accordance with one or more embodiments. Request 212 is received by computer system 202. Software application 204 on computer system 202 may call and/or employ one or more geocoding services and NLP models to perform the geocoding process 800. At block 802, software application 204 is configured to search request 212 for geocoded data. Searching request 212 also includes searching header information and other information associated with request 212. The header information may be utilized to send the request 212 from user computer system 230 to computer system 202. As discussed herein, geocoded data can include the name of a country such as "Country D", the zip code of the user and/or user computer system 230, IP address of the user computer system 230 (or modem), etc.

At block 804, software application 204 is configured to perform and/or cause a lookup of the country code in geocoding databases 216 using the geocoded data. At block 806, software application 204 is configured to check if the country code is found. If (YES) the country code is found, software application 204 provides the country code at block 810. If (NO) the country code is not found, software application is configured to employ and/or request NLP-assisted reverse geocoding using, for example, text processing model 206 (NLP model) at block 808. The output from text processing model 210 is provided to block 804.

Figure 9:
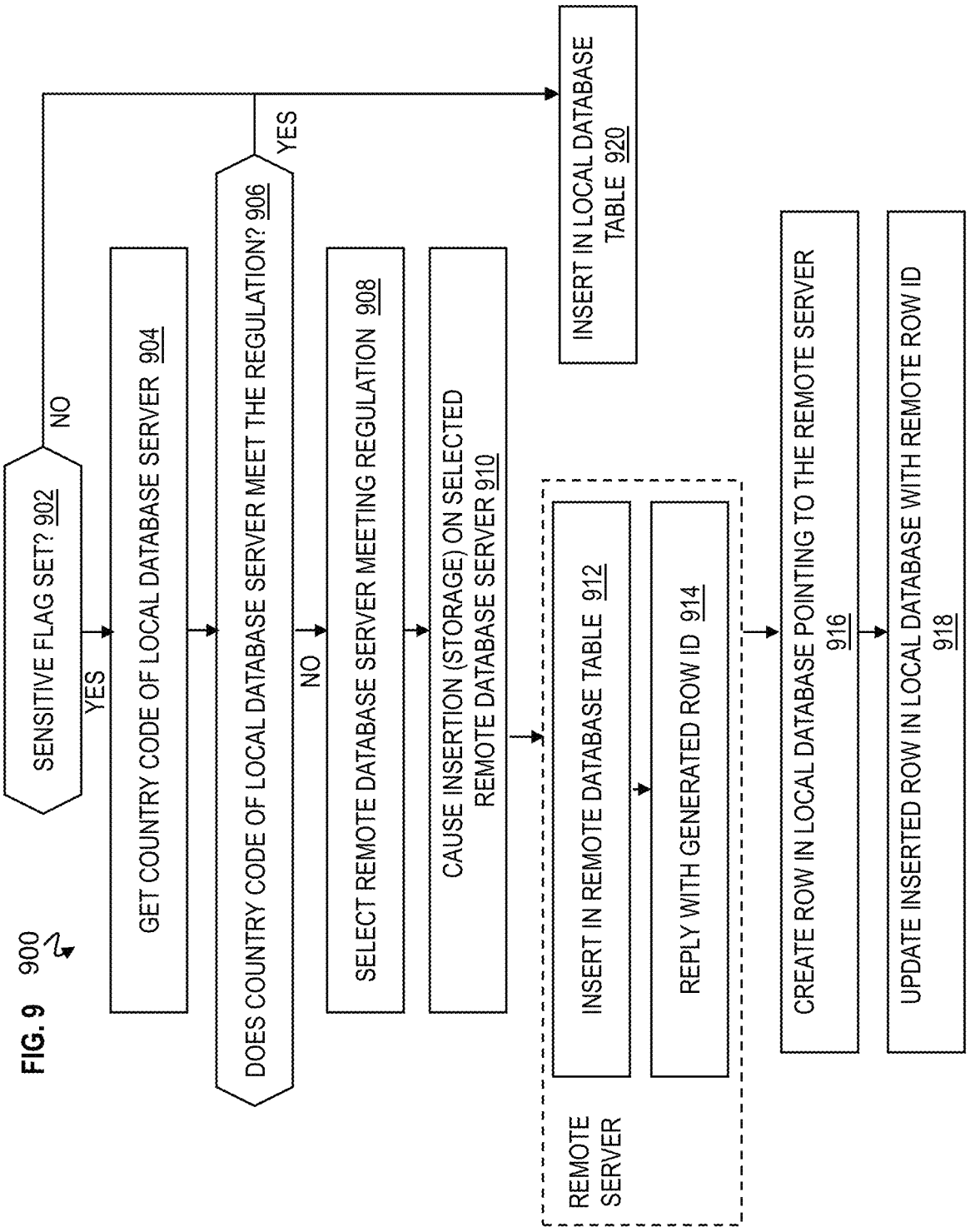
FIG. 9 is a flowchart of an example computer-implemented store procedure in accordance with one or more embodiments of the present invention.

FIG. 9 is a flowchart of an example computer-implemented store procedure 900 in accordance with one or more embodiments. Request 212 is received by computer system 202. At block 902, software application 204 is configured to check if the (sensitive) remote flag/bit 520 is set in a row corresponding to request 212 in the table of local database 214. If (NO) there is no sensitive flag set, software application 204 is configured to insert/store the information of request 212 in the local database table of local database 214 at block 920.

At block 904, if there is a (sensitive) remote flag/bit 520 set, software application 204 is configured to get the (stored) country code of the local database server (e.g., computer system 202). Also, software application 204 is configured to retrieve the country code and/or regulation code for request 212.

At block 906, software application 204 is configured to check if the country code of the local database server (e.g., computer system 202) meets the regulation of the regulation code for request 212. If (YES) the country code of the local database server meets the regulation code, software application 204 is configured to insert/store the information of request 212 in the local database table of local database 214 at block 920. If (NO) the country code of the local database server does not meet the regulation code for request 212, software application 204 is configured to search for and select a remote database server meeting the regulation of the regulation code for request 212. For example, software application 204 may search the respective country codes associated with computer systems 220A-220Z in respective geographical locations/regions A-Z to find a country code that meets and/or matches the county code(s) of the regulation. For example, the regulation code for request 212 may require that the request 212 be processed in geographical location/region D. In this case, software application 204 is configured to select computer system 220D with the country code for geographical location/region D.

At block 908, software application 204 is configured to cause the insertion (storage) of the request 212 on selected computer system (e.g., computer system 220D). As an example remote server which is interchangeably used as remote database server, computer system 220 (e.g., computer system 220D) is configured to insert the information of request 212 in a row of remote database table of remote database 222 (e.g., remote database 222D) and generate a row identification (ID) at block 912. As the remote server, computer system 220 (e.g., computer system 220D) is configured to reply to software application 204 of computer system 202 with the generated ID at block 914.

At blocks 916, 918, in response to receiving the remote row ID of the remote table in remote database 222, software application 204 is configured to create a row in the local database table of local database 214 pointing to the remote server (e.g., computer system 220D) and update the inserted row in local database 214 with the remote row ID.

Figure 10:
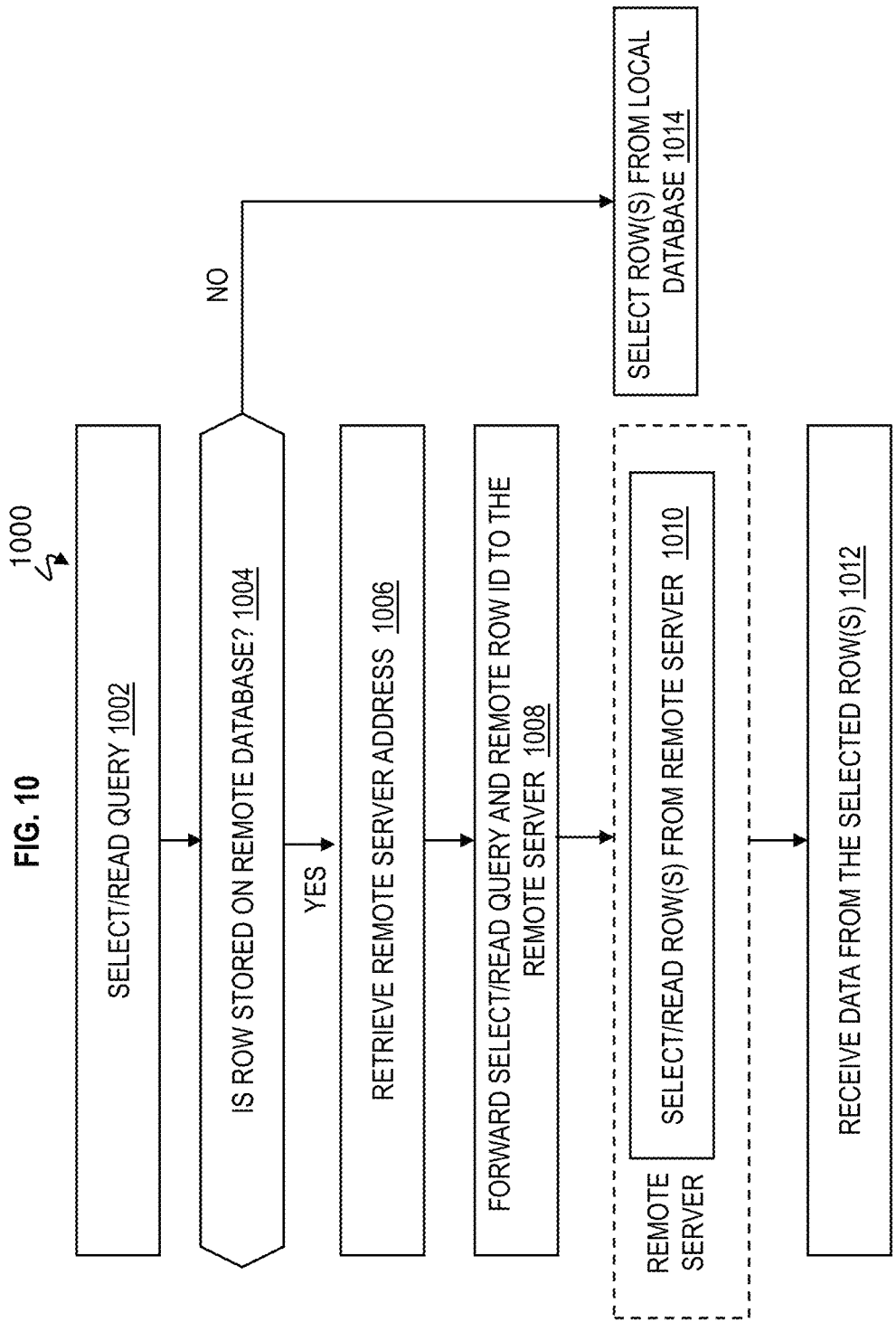
FIG. 10 is a flowchart of an example computer-implemented select/read procedure in accordance with one or more embodiments of the present invention.

FIG. 10 is a flowchart of an example computer-implemented select/read procedure 1000 in accordance with one or more embodiments. At block 1002, software application 204 is configured to receive request 212 from user computer system 230. At block 1004, software application 204 is configured to check if the row associated with request 212 is stored on a remote server. For example, software application 204 may check if (sensitive) remote flag/bit 520 is set for the row corresponding to request 212 in the table of local database 214. If (NO) there is no sensitive flag set and if the row is stored in local database 214, software application 204 is configured to select/read the row(s) in the local database table of local database 214 at block 1014.

At block 1006, if there is a (sensitive) remote flag/bit 520 set and if the row(s) corresponding to request 212 is not stored in the table of local database 214, software application 204 is configured to retrieve the remote server address (i.e., the pointer, remote row ID, etc.) of the remote server (e.g., computer system 220). Continuing the example scenario, the remote server may be computer system 220D and the remote server address may be saved in the local row of local database 214.

At block 1008, software application 204 is configured to forward the select/read query (i.e., request 212) and the remote row ID to the remote server address of the remote server (e.g., computer system 220D) to cause the selection/reading of the remote rows on computer system (e.g., computer system 220D). At block 1010, the remote server (e.g., computer system 220D) is configured to select/read remote row(s) in remote database 222 (e.g., remote database 222D), particularly, the information in the remote row(s). At block 1012, software application 204 is configured to receive the data of the remote row(s) from the remote server and pass the data to, for example, the user of user computer system 230.

Figure 11:
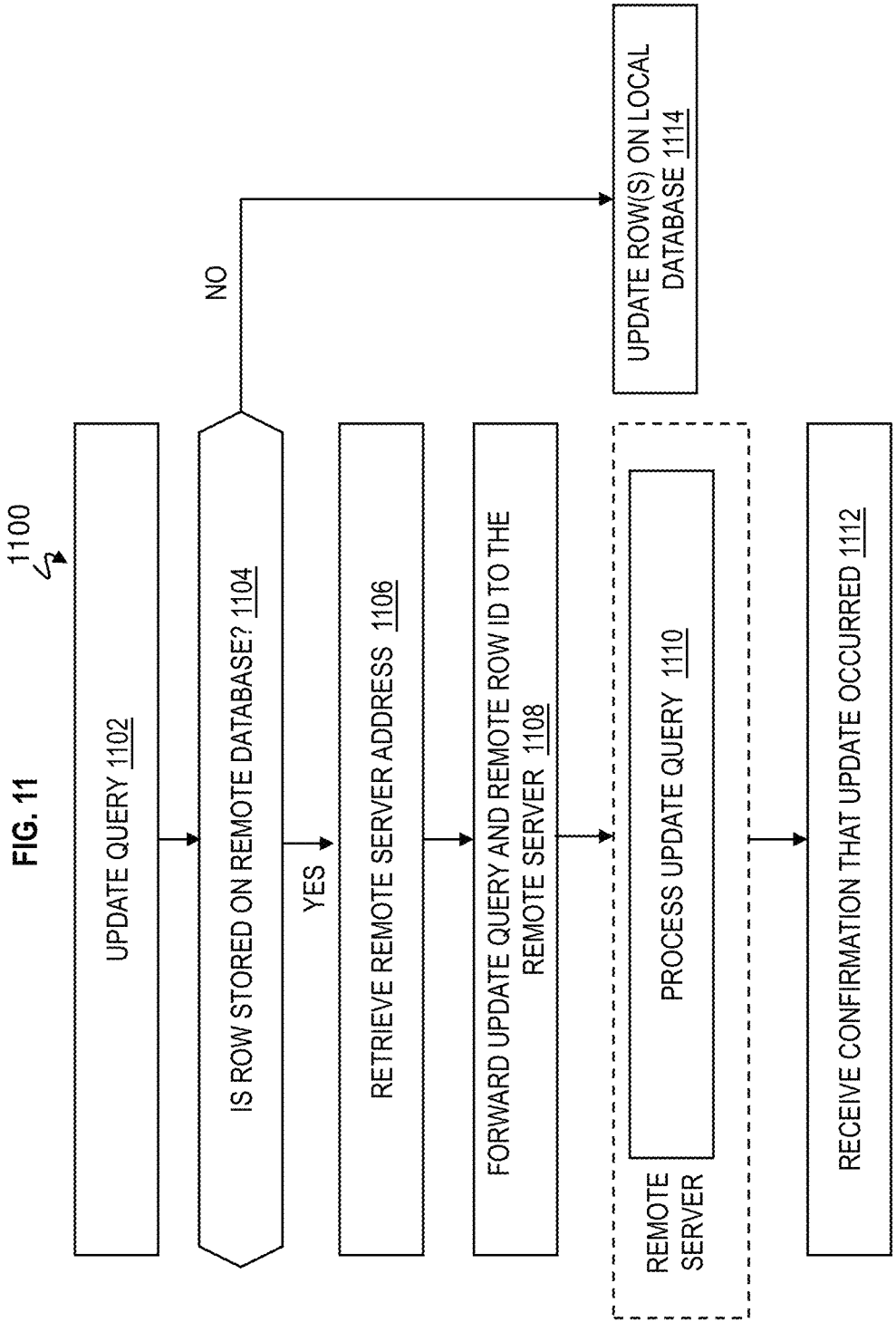
FIG. 11 is a flowchart of an example computer-implemented update/change procedure in accordance with one or more embodiments of the present invention.

FIG. 11 is a flowchart of an example computer-implemented update/change procedure 1100 in accordance with one or more embodiments. At block 1102, software application 204 is configured to receive request 212 from user computer system 230. At block 1104, software application 204 is configured to check if the row associated with request 212 is stored on a remote server. For example, software application 204 may check if (sensitive) remote flag/bit 520 is set for the row corresponding to request 212 in the table of local database 214. If (NO) there is no sensitive flag set and the row is stored in local database 214, software application 204 is configured to update/change the row(s) in the local database table of local database 214 at block 1114.

At block 1106, if (YES) there is a (sensitive) remote flag/bit 520 set and if the row(s) corresponding to request 212 is not stored in the table of local database 214, software application 204 is configured to retrieve the remote server address (i.e., the pointer, remote row ID, etc.) of the remote server (e.g., computer system 220). Again, the remote server may be computer system 220D and the remote server address may be saved in the local row of local database 214. Although the example scenario is used for consistency and explanation purposes, it should be appreciated that the remote server could be any of the remote computer systems 220.

At block 1108, software application 204 is configured to forward the update/read query (i.e., request 212) and the remote row ID to the remote server address of the remote server (e.g., computer system 220D) to cause the update/change of the information in the remote rows on computer system (e.g., computer system 220D). At block 1110, the remote server (e.g., computer system 220D) is configured to update/change information of remote row(s) in remote database 222 (e.g., remote database 222D). At block 1112, software application 204 is configured to receive confirmation that the update/change to the remote row(s) from the remote server.

Figure 12:
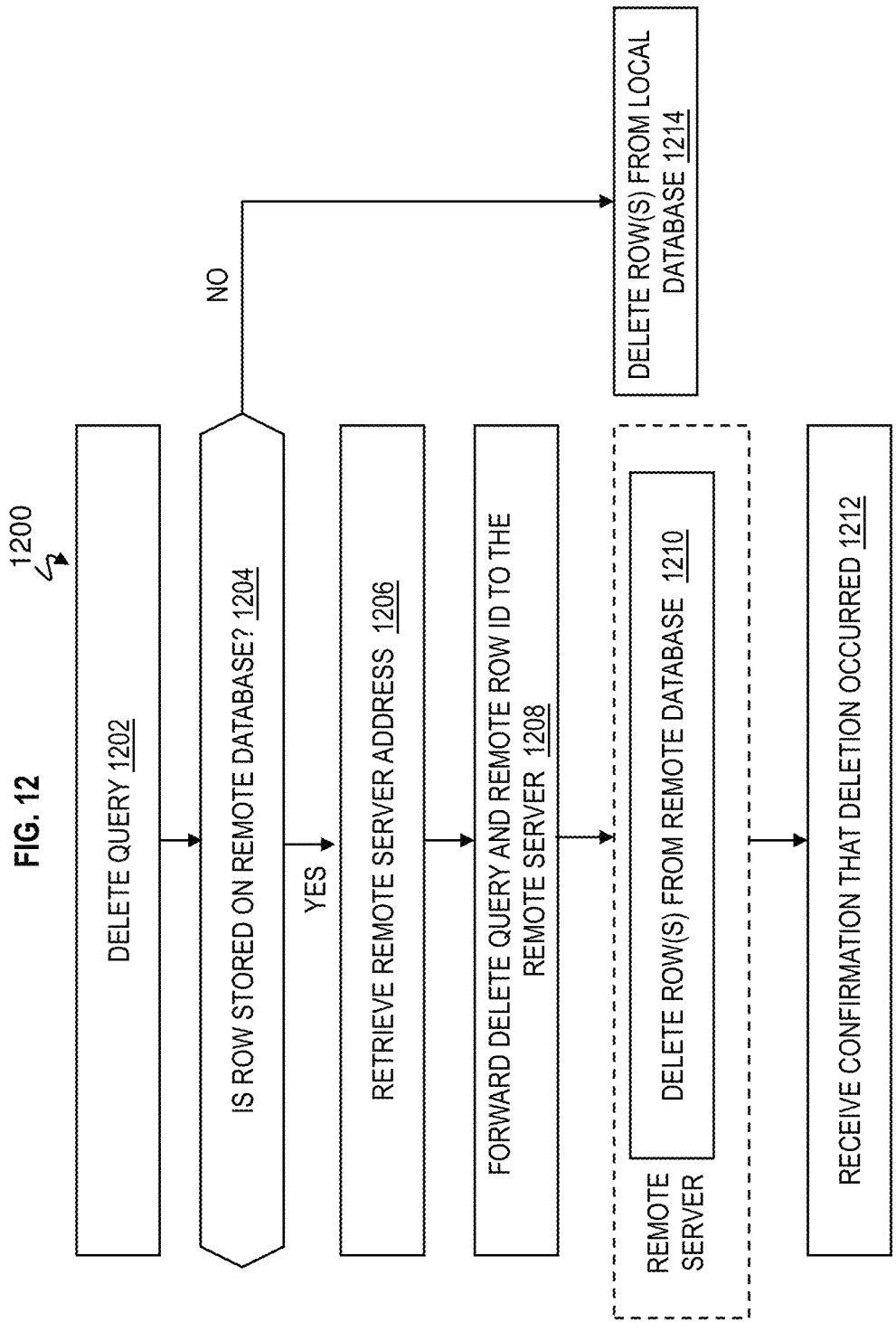
FIG. 12 is a flowchart of an example computer-implemented delete procedure in accordance with one or more embodiments of the present invention.

FIG. 12 is a flowchart of an example computer-implemented update/change procedure 1200 in accordance with one or more embodiments. At block 1202, software application 204 is configured to receive request 212 from user computer system 230. At block 1204, software application 204 is configured to check if the row associated with request 212 is stored on a remote server. For example, software application 204 may check if (sensitive) remote flag/bit 520 is set for the row corresponding to request 212 in the table of local database 214. If (NO) there is no sensitive flag set and if the row is stored in local database 214, software application 204 is configured to delete the row(s) in the local database table of local database 214 at block 1214.

At block 1206, if (YES) there is a (sensitive) remote flag/bit 520 set and if the row(s) corresponding to request 212 is not stored in the table of local database 214, software application 204 is configured to retrieve the remote server address (i.e., the pointer, remote row ID, etc.) of the remote server (e.g., computer system 220). Again, the remote server may be computer system 220D and the remote server address may be saved in the local row of local database 214. At block 1208, software application 204 is configured to forward the delete query (i.e., request 212) and the remote row ID to the remote server address of the remote server (e.g., computer system 220D) to cause the update/change of the information in the remote rows on computer system (e.g., computer system 220D). At block 1210, the remote server (e.g., computer system 220D) is configured to delete the remote row(s) in remote database 222 (e.g., remote database 222D). At block 1212, software application 204 is configured to receive confirmation of the deletion of the remote row(s) from the remote server.

Figure 13:
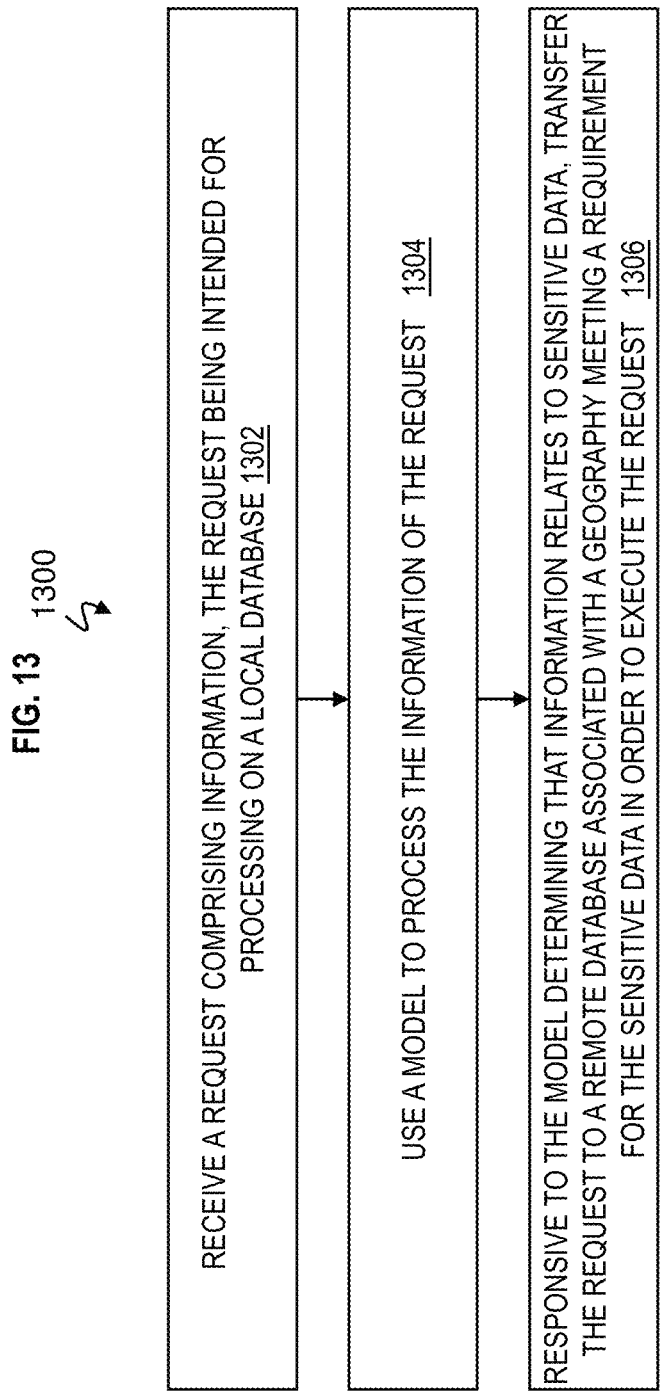
FIG. 13 is a flowchart of a computer-implemented method for keeping databases compliant with data protection regulations by sensing the presence of sensitive data and transferring the data to compliant geographies in accordance with one or more embodiments of the present invention.

FIG. 13 is a flowchart of a computer-implemented method 1300 for keeping databases compliant with data protection regulations by sensing the presence of sensitive data and transferring the data to compliant geographies in accordance with one or more embodiments of the invention. Computer-implemented method 1300 may be performed using computer system 202 in FIG. 2. Functions of computer systems can use and/or implemented in hardware components of hardware and software layer 60 and/or workloads of workload layer 90 depicted in FIG. 15.

At block 1302, software application 204 is configured to receive a request 212 comprising information, the request 212 being intended for processing on a local database 214. At block 1304, software application 204 is configured to use a model 210 to process the information of the request 212. At block 1306, responsive to the model 210 determining that information relates to sensitive data, software application 204 is configured to transfer the request 212 to a remote database (e.g., one of the remote databases 222A-222Z) associated with a geography (e.g., geographical location/region A-Z) meeting a requirement for the sensitive data in order to execute the request 212.

Responsive to the model 210 determining that information relates to non-sensitive data, software application 204 is configured to cause the information to be processed on the local database 214 in order to complete the request. A regulation code (e.g., from regulation code database 218) is associated with the request 212, the model 210 being configured to use the regulation code to determine that the information relates to the sensitive data. A country code (e.g., from one or more geocoding databases 216) is associated with the request 212, the model 210 being configured to use the country code to determine that the information relates to the sensitive data.

Software application 204 is configured to cause feature extraction model 208 to convert the information of the request 212 into feature vectors 702 and convert the feature vectors 702 into a document vector 704 that is used by the model 210 to determine that the information relates to the sensitive data.

Responsive to the request being a select query, an update query, or a delete query, software application 204 is configured to determine (e.g., by remote flag/bit 520) that one or more rows are stored on the remote database (e.g., one of remote databases 222A-222Z on computer systems 220A-220Z, respectively) instead of the local database 214 and retrieve a remote address (e.g., pointer and remote row ID) associated with the remote database.

Responsive to the request 212 being a store command, software application 204 is configured to determine a regulation code (e.g., from regulation code database 218) associated with the request 212, the regulation code comprising the requirement (e.g., a privacy rule or regulation indicating the geographical location/region where user data is to be stored). Software application 204 is configured to select the remote database (e.g., remote database 222D) associated with the geography meeting the requirement of the regulation code. Responsive to transferring the request to the remote database and receiving a remote row identification associated with one or more rows of the remote database, software application 204 is configured to create a local row in the local database 214 (e.g., local row 504 in view 502) that contains the remote row identification for the sensitive data.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 14:
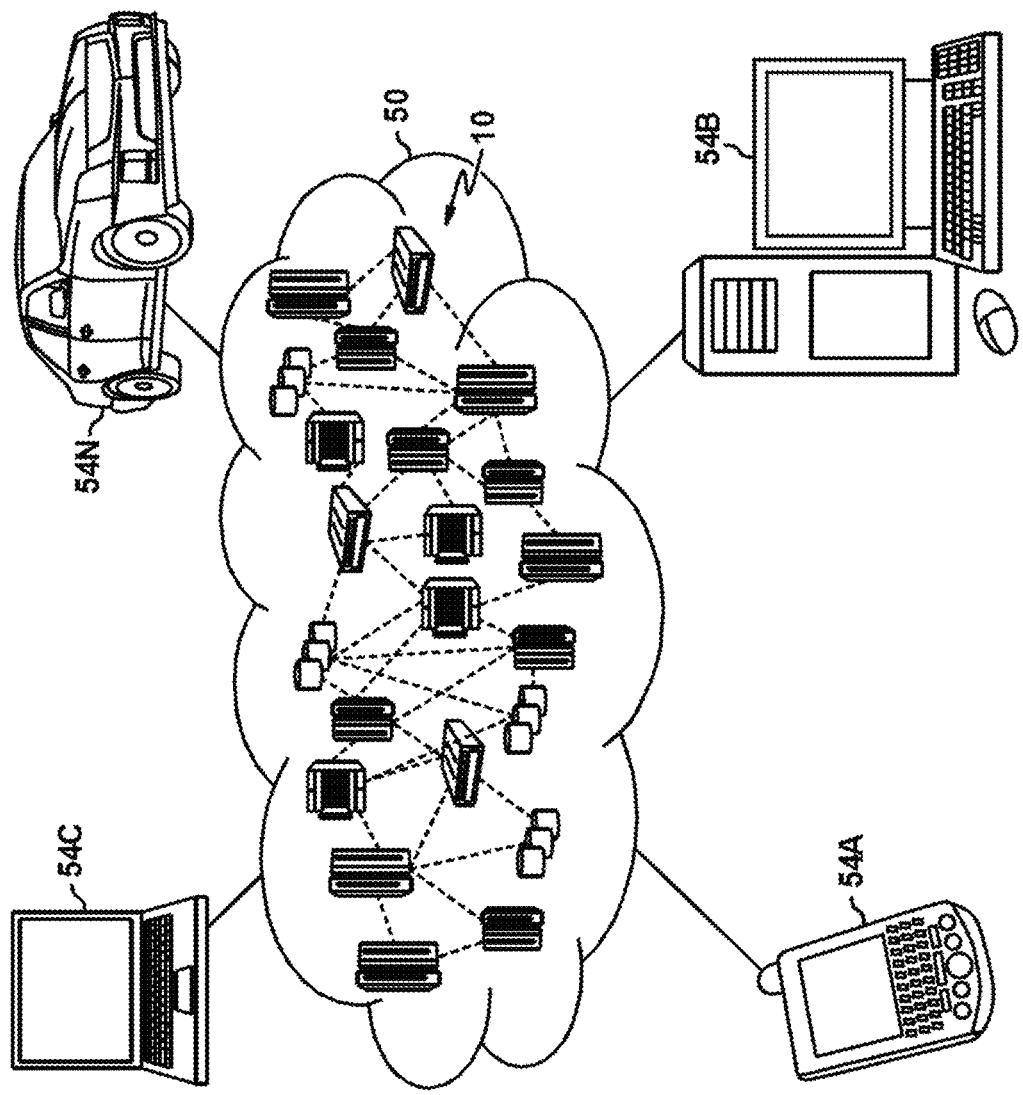
FIG. 14 depicts a cloud computing environment according to one or more embodiments of the present invention.

Referring now to FIG. 14, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 14 are intended to be illustrative only and that computing nodes 10 and cloud computing environment 50 can communicate with any type of computerized device over any type of network and/or network addressable connection (e.g., using a web browser).

Figure 15:
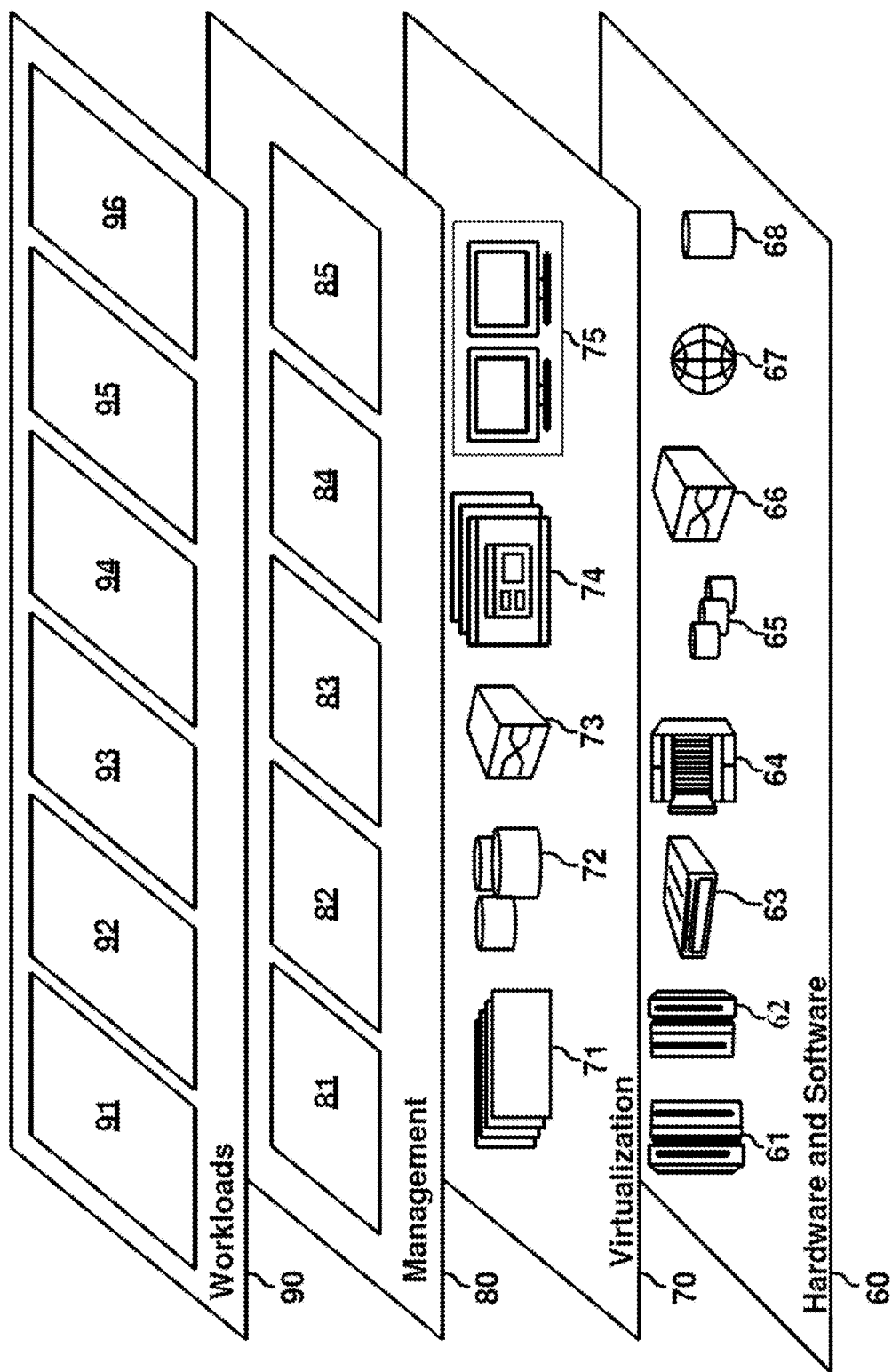
FIG. 15 depicts abstraction model layers according to one or more embodiments of the present invention.

Referring now to FIG. 15, a set of functional abstraction layers provided by cloud computing environment 50 (FIG. 14) is shown. It should be understood in advance that the components, layers, and functions shown in FIG. 15 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workloads and functions 96. Workloads and functions 96 may include various software applications including software application 204, software on computer systems 220, etc., discussed herein. Computer systems 202, 220 may include functionality and components of hardware and software layer 60.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
receiving a request comprising information, the request being intended for processing on a local database;
using a model to process the information of the request;
wherein a regulation code is associated with the request, the model being configured to use the regulation code to determine that the information relates to sensitive data;
responsive to the model determining that the information relates to the sensitive data, transferring the request to a remote database associated with a geography meeting a requirement for the sensitive data in order to execute the request;
selecting the remote database associated with the geography meeting the requirement of the regulation code; and
responsive to transferring the request to the remote database and receiving a remote row identification associated with one or more rows of the remote database, creating a local row in the local database that contains the remote row identification for the sensitive data.

2. The computer-implemented method of claim 1 further comprising responsive to the model determining that the information relates to non-sensitive data, causing the information to be processed on the local database in order to complete the request.

3. The computer-implemented method of claim 1, wherein a country code is associated with the request, the model being configured to use the country code to determine that the information relates to the sensitive data.

4. The computer-implemented method of claim 1 further comprising:
converting the information of the request into feature vectors; and
converting the feature vectors into a document vector that is used by the model to determine that the information relates to the sensitive data.

5. The computer-implemented method of claim 1 further comprising:
responsive to the request being a select query, an update query, or a delete query, determining that one or more rows are stored on the remote database instead of the local database; and
retrieving a remote address associated with the remote database.

6. The computer-implemented method of claim 1 further comprising:
responsive to the request being a store command, determining the regulation code associated with the request, the regulation code comprising the requirement.

7. A system comprising:
a memory having computer readable instructions; and
one or more processors for executing the computer readable instructions, the computer readable instructions controlling the one or more processors to perform operations comprising:
receiving a request comprising information, the request being intended for processing on a local database;
using a model to process the information of the request;
wherein a regulation code is associated with the request, the model being configured to use the regulation code to determine that the information relates to sensitive data;
responsive to the model determining that the information relates to the sensitive data, transferring the request to a remote database associated with a geography meeting a requirement for the sensitive data in order to execute the request;
selecting the remote database associated with the geography meeting the requirement of the regulation code; and
responsive to transferring the request to the remote database and receiving a remote row identification associated with one or more rows of the remote database, creating a local row in the local database that contains the remote row identification for the sensitive data.

8. The system of claim 7, wherein the one or more processors perform operations further comprising responsive to the model determining that the information relates to non-sensitive data, causing the information to be processed on the local database in order to complete the request.

9. The system of claim 7, wherein a country code is associated with the request, the model being configured to use the country code to determine that the information relates to the sensitive data.

10. The system of claim 7, wherein the one or more processors perform operations further comprising:
converting the information of the request into feature vectors; and
converting the feature vectors into a document vector that is used by the model to determine that the information relates to the sensitive data.

11. The system of claim 7, wherein the one or more processors perform operations further comprising:
responsive to the request being a select query, an update query, or a delete query, determining that one or more rows are stored on the remote database instead of the local database; and
retrieving a remote address associated with the remote database.

12. The system of claim 7, wherein the one or more processors perform operations further comprising:
responsive to the request being a store command, determining the regulation code associated with the request, the regulation code comprising the requirement.

13. A computer program product comprising a computer readable storage medium having program instructions embodied therewith, the program instructions executable by one or more processors to cause the one or more processors to perform operations comprising:
receiving a request comprising information, the request being intended for processing on a local database;
using a model to process the information of the request;
wherein a regulation code is associated with the request, the model being configured to use the regulation code to determine that the information relates to sensitive data;
responsive to the model determining that the information relates to the sensitive data, transferring the request to a remote database associated with a geography meeting a requirement for the sensitive data in order to execute the request;
selecting the remote database associated with the geography meeting the requirement of the regulation code; and
responsive to transferring the request to the remote database and receiving a remote row identification associated with one or more rows of the remote database, creating a local row in the local database that contains the remote row identification for the sensitive data.

14. The computer program product of claim 13, wherein the one or more processors perform operations further comprising responsive to the model determining that the information relates to non-sensitive data, causing the information to be processed on the local database in order to complete the request.

15. The computer program product of claim 13, wherein a country code is associated with the request, the model being configured to use the country code to determine that the information relates to the sensitive data.

16. The computer program product of claim 13, wherein the one or more processors perform operations further comprising:
converting the information of the request into feature vectors; and
converting the feature vectors into a document vector that is used by the model to determine that the information relates to the sensitive data.

17. The computer program product of claim 13, wherein the one or more processors perform operations further comprising:
responsive to the request being a select query, an update query, or a delete query, determining that one or more rows are stored on the remote database instead of the local database; and
retrieving a remote address associated with the remote database.

* * * * *